Feb. 10, 1925. 1,525,449
J. JOHNSON
STRAINING AND WASHING APPARATUS
Filed Feb. 21, 1919 2 Sheets-Sheet 2
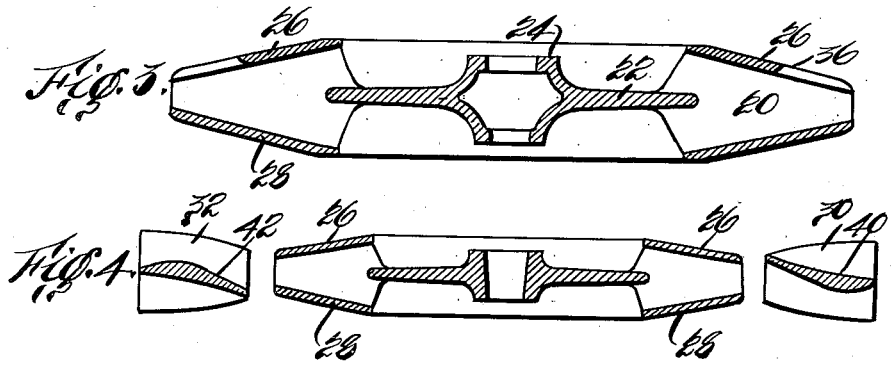
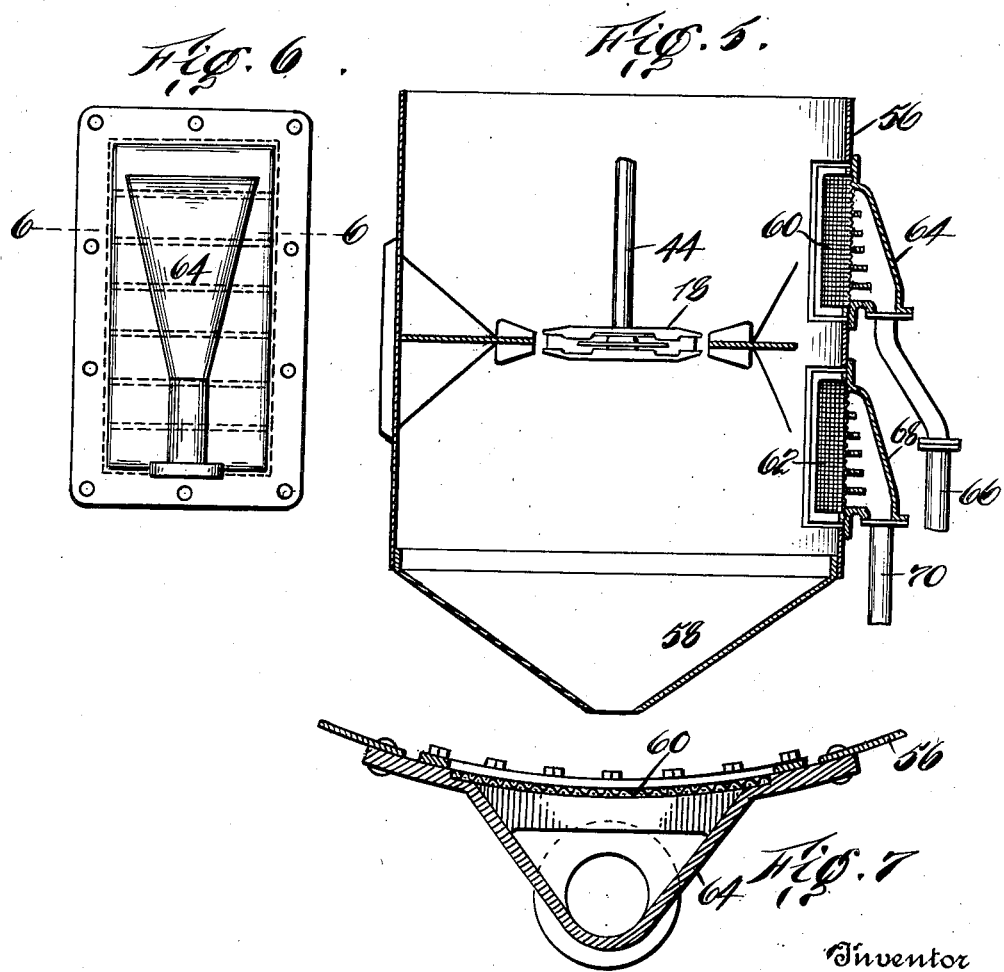
Inventor
John Johnson.
By his Attorney Patented Feb. 10, 1925.

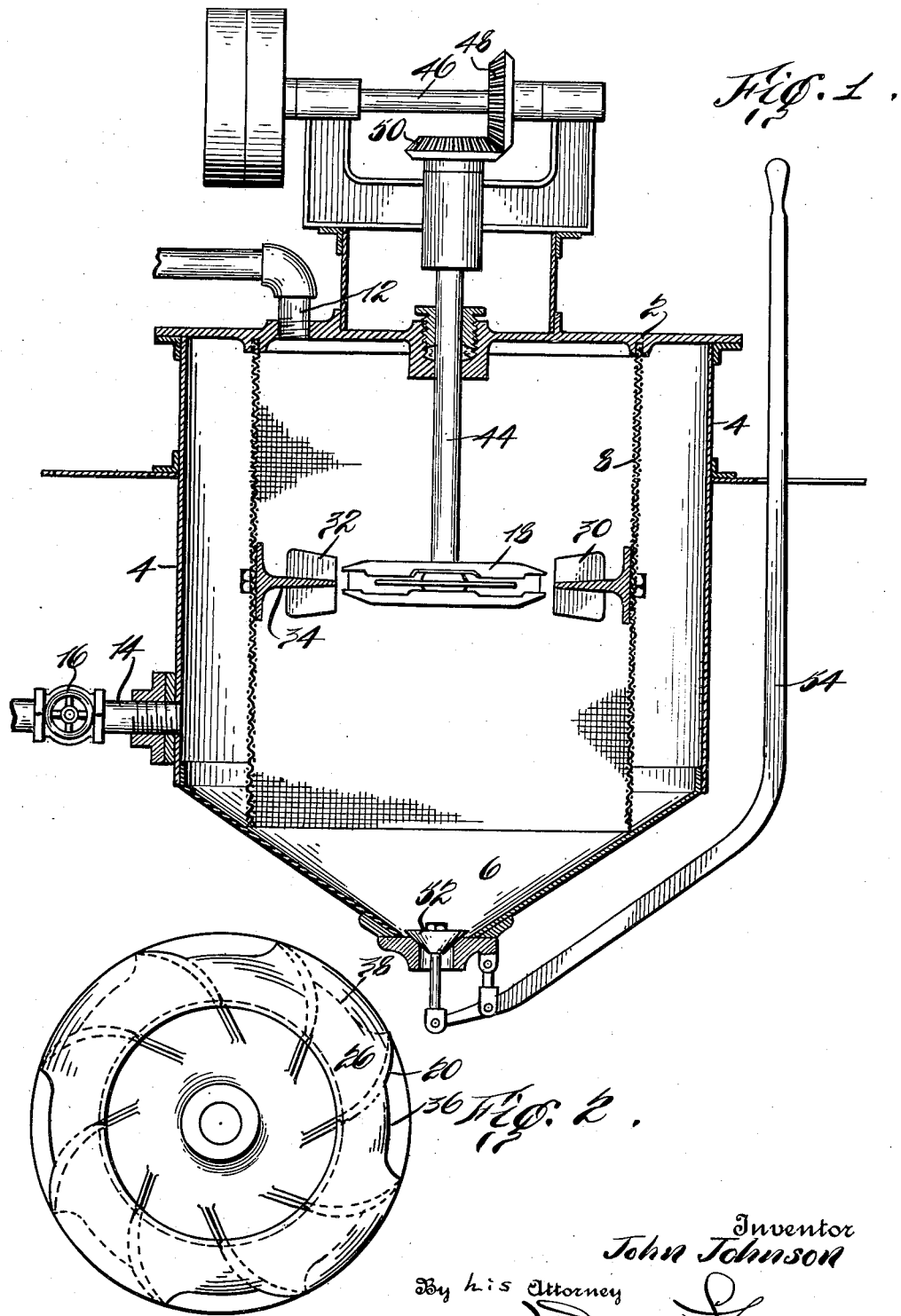

1,525,449

UNITED STATES PATENT OFFICE.

JOHN JOHNSON, OF BROOKLYN, NEW YORK.

STRAINING AND WASHING APPARATUS.

Application filed February 21, 1919. Serial No. 278,468.

*To all whom it may concern:*

Be it known that I, JOHN JOHNSON, a citizen of the United States, residing at Brooklyn, New York, have invented certain new and useful Improvements in Straining and Washing Apparatus, of which the following is a clear, full, and exact description.

My invention relates to straining and washing apparatus, and among the objects thereof is the production of such an apparatus as will be very rapid both in its washing and straining operations, and one in which clogging of the strainer during such straining and washing operations is effectually prevented.

An important feature of the invention relates to the provision of means for directing a current of the materials to be strained directly across the face of the strainer to thereby prevent accumulation of solid matter thereon which solid matter tends to clog the strainer and slow down the straining and washing process.

Another important feature of the invention is the provision of a strainer in the form of a cylinder and means for directing a current of materials to be strained along substantially the entire face of the cylindrical surface, thus insuring rapid straining action and also preventing accumulation of solid matter on the strainer.

Still another important feature of the invention relates to the provision of means for thoroughly and rapidly mixing the contents of the container and the provision of straining means over a part only of the cylindrical surface of the container to more effectively wash the materials to be strained. Thorough washing as well as straining is desirable in some cases as, for instance, in the treating of pulp, and by making the washing action rapid relative to the straining action, this end is accomplished.

Still other objects and important features of the invention will be apparent from the following description and claims when taken in connection with the accompanying drawings in which—

Fig. 1 is a part sectional, part elevational view of a mixing and straining apparatus;

Fig. 2 is a top plan view of a suitable turbine mixer;

Fig. 3 is a sectional view of the turbine mixer shown in Fig. 2;

Fig. 4 is a sectional view of a different form of mixer;

Fig. 5 is a part sectional, part elevational view of a screening and washing apparatus, differing somewhat from the apparatus shown in Fig. 1 in details which will hereinafter appear;

Fig. 6 is a front elevational view of a strainer box; and

Fig. 7 is a sectional view along the lines 6—6 of Fig. 6.

Referring to the drawings, 2 represents a container having cylindrical walls 4 at its upper portion and a cone-shaped chamber 6 at its lower portion. Within the container 2 is a strainer 8 also in the form of a cylinder, there being a space between the cylindrical surface of the strainer 8 and the cylindrical walls 4 of the container. The substances to be strained enter within the strainer 8 through a supply pipe 12. The strained liquid passes out of the container through the outlet pipe 14 controlled by a suitable valve 16.

For the purpose of producing a thorough mixing of the materials within the container and in order to prevent clogging of the strainer by the deposits of solid matter within the meshes thereof and on the inside, I provide means for directing a constant stream of the materials within the container across the face of the strainer, which means preferably comprise a turbine mixer situated at about the center of the container and so constructed that material flowing into the mixer flows out of the same from all sides thereof, both upwardly and downwardly across the face of the strainer 8.

The form of mixer may advantageously be that shown and described in my Patent No. 1,354,489, granted Oct. 5, 1920, and which is constructed as follows: The wheel or mixer 18 has a central opening as indicated in Fig. 2 both at its upper and lower sides, and is also provided with blades 20 which are carried by a central disc 22 shown in Fig. 3, said disc 22 being integral with the hub 24 of the wheel. These blades 20, as shown in Fig. 2, are inclined away from the direction of rotation of the wheel or mixer so as to insure a centrifugal flow of the materials to be mixed, and the materials are guided as they flow toward the periphery of the wheel by upper and lower plates 26 and 28, which are inclined toward each other as they approach the periphery. From an inspection of Figs. 1 and 3 it will be seen that the materials are drawn into the central opening of the turbine wheel from both above and below the wheel by the centrifugal action created by the blades 20. In order to insure proper mixing of the materials without a bodily whirling motion of the container contents, baffle plates 30 and 32, Fig. 1, may be provided about the periphery of the wheel, these plates being inclined to the periphery in the manner disclosed in my patent above referred to.

In order that a part of the stream of discharged material may be directed toward the bottom of the container and part toward the top, these baffle plates 30 and 32 may be formed, respectively, upon the upper and lower sides of the separating plate 34 which surrounds the mixing wheel at its middle, also as described in my application above referred to.

It will be noted that the streams which enter the mixer from both above and below are discharged from common discharge openings. In other words, the two streams mingle in the wheel, and in order that a part of these mingled streams may be discharged toward the top of the container and another part toward the bottom, the plates 26 and 28 are preferably so formed that successive discharge openings direct a greater part of the flow in opposite direction as shown in Figs. 2 and 3 of the drawings. The discharge opening between two successive plates 20 is enlarged by having the upper plate cut back as shown at 36, Fig. 2, while the discharge opening between the succeeding blades 20 is enlarged by having the lower plate cut back as shown in dotted lines at 38, Fig. 2.

Instead of the construction above described, I may also use the construction shown in Fig. 4, which construction is also shown and described in my application above referred to. In this form the separating and distributing action of the mixer is obtained by making the separating plate, which connects the baffles 30 and 32, in the form of alternately upwardly and downwardly directing sections 40 and 42. In this construction the upper and lower plates 26 and 28 of the mixing wheel or turbine will extend equally to the periphery about the whole circumference of the wheel.

The wheel may be driven by means of a shaft 44 connected with the hub 24, said shaft 44 being connected to a power shaft 46 through suitable gearing 48 and 50.

With the construction above described, the contents of the container moves outwardly from the turbine in substantially radial lines from the center of the container and is directed both upwardly and downwardly by the baffles surrounding the container so that a portion of the stream from the turbine is directed upwardly across the face of the cylindrical strainer 8 and another portion is directed downward across the face of said strainer. This movement is quite rapid and tends to constantly keep the strainer clean so that the straining action is very rapid. The solid matter thus washed off from the inner surface of the strainer collects in the conical bottom of the container where it may be flushed out from time to time through an opening in the bottom of the container normally closed by a valve 52 controlled by lever 54, as clearly indicated in Fig. 1.

In some operations it is desirable to subject the material acted upon to a very thorough washing action as, for instance, in the treatment of pulp. In such cases it may be desirable to use a straining apparatus of somewhat different construction from that above described, and for this purpose I prefer that form of device shown in Fig. 5. In this form the container has a cylindrical upper portion 56 and a conical lower portion 58 similar to that already described in connection with that form of apparatus shown in Fig. 1. I provide strainers which extend around only in a portion of the surface of the container, these strainers being shown at 60 and 62, Fig. 5, one strainer above and the other below the horizontal axis of the container. For the purpose of thoroughly mixing the container contents, I may provide a turbine of the construction already described. By reason of the fact that the straining surface is relatively small in proportion to the entire cylindrical surface of the container, the washing and mixing action will be more rapid in proportion to the straining action. The wash water from the container flows through the strainers 60, 62 and is guided by the plates 64 and 68 of the strainer boxes to outlet pipe 66 and 70 as clearly indicated in Fig. 5.

From the foregoing it will be seen that I have provided a container having a strainer therein and means located within the strainer for directing a stream of the liquid to be strained across the face of the strainer, thus insuring that the strainer may be kept free from clogging, thereby promoting rapid straining action. It will also be noted that I have so arranged my strainer with respect to the mixer that the mixer performs both a mixing and cleaning action. In the case of materials wherein thorough washing is necessary, I have provided an apparatus in which there is a thorough mixing of the wash liquid with the material to be washed, at the same time insuring that the straining shall be as rapid as is consistent with thorough washing.

Having thus described my invention, what

I claim and desire to secure by Letters Patent is:

1. In a strainer, the combination with a tank having straining means situated in the walls thereof, of means situated substantially midway between the ends of the tank for directing a stream of the liquid to be strained radially, and means for deflecting said stream in opposite directions along the surface of the walls and substantially parallel to the straining means to thereby clean the latter.

2. In a combined mixer and strainer, the combination of a chamber provided with straining means, of means for mixing the contents of the chamber, said mixing means constructed to direct a stream of the material to be strained radially, and means situated adjacent the mixing means for diverting the stream both upwardly and downwardly across the face of said straining means.

3. In a straining and washing apparatus, the combination with a cylindrical container, of straining means in a portion only of the cylindrical wall thereof, and means for producing a washing action of the contents of said container and a flow of the contents across the face of the straining means.

4. In a straining and washing apparatus, the combination with a cylindrical container, of screening means situated on either side of the center of the cylindrical wall of said container and occupying a portion only of said wall, and means for producing a flow of materials from the center of the container, both upwardly and downwardly along the walls of the container and across the face of the straining means.

Signed at Brooklyn, N. Y., this 9th day of January, 1919.

JOHN JOHNSON.

Witnesses:
  DANIEL O. MICHEL,
  MARY E. MICHEL.